United States Patent [19]

Yun et al.

[11] Patent Number: 5,034,444

[45] Date of Patent: Jul. 23, 1991

[54] RHEOLOGICAL ADDITIVE FOR COATING COMPOSITIONS

[75] Inventors: Han B. Yun, Princeton Junction; Alan Smith, Freehold, both of N.J.

[73] Assignee: Rheox, Inc., Hightstown, N.J.

[21] Appl. No.: 539,545

[22] Filed: Jun. 18, 1990

Related U.S. Application Data

[62] Division of Ser. No. 236,990, Aug. 26, 1988, abandoned.

[51] Int. Cl.$^5$ .................................................. C08K 5/20
[52] U.S. Cl. .................................... 524/223; 524/241; 524/244; 524/245; 524/251; 524/252; 524/306; 524/597; 524/556; 524/538; 524/563
[58] Field of Search ............... 524/223, 241, 244, 245, 524/251, 252

[56] References Cited

U.S. PATENT DOCUMENTS 3,459,585  12/1966  Killmeyer et al. ................. 525/17

Primary Examiner—Joseph L. Schofer
Assistant Examiner—Mark D. Sweet
Attorney, Agent, or Firm—Burns, Doane, Swecker & Mathis

[57] ABSTRACT

A rheological additive for non-aqueous coating compositions is disclosed. The additive may be the reaction product of an alkoxylated aliphatic nitrogen-containing compound, an aliphatic diamine or mixtures thereof, and an organic polycarboxylic anhydride or acid, an alkanediol polyepoxide ether, or mixtures thereof. The additive provides excellent anti-sag and storage stability properties, particularly for high solids coating compositions, without causing a significant increase in viscosity. Also disclosed are coating compositions containing the additive.

6 Claims, No Drawings

RHEOLOGICAL ADDITIVE FOR COATING COMPOSITIONS

This application is a divisional of application Ser. No. 236,990, filed Aug. 26, 1988, now abandoned.

BACKGROUND OF THE INVENTION

1. Field of the Invention

The present invention relates to a rheological additive for coating compositions, especially high solids coating compositions. The present invention also relates to non-aqueous coating compositions containing the rheological additive

2. Description of the Prior Art

Recently the art has sought to reformulate its coating products in an effort to comply with certain government regulations on the emission of organic solvents from surface coating operations. One area of substantial activity has been in the development of high solids solvent-borne coatings, especially high solids baking enamels. These systems have gained a great deal of acceptance in several areas such as coatings for metal furniture and fixtures, metal machinery and equipment, metal appliances, automotive topcoats, can coatings and flat stocks.

To comply with government regulations (e.g., Volatile Organic Content ("VOC") standards), the higher molecular weight resins used in conventional solvent coating systems have been replaced with lower molecular weight resins in high solids coating compositions which have a low solvent content. The conventional coatings, which include higher molecular weight resins, generally have high package viscosities and, therefore, are typically diluted substantially with a solvent prior to application. This reduces the viscosity so that the coating composition may be sprayed. These conventional compositions generally do not experience significant problems with viscosity and sag resistance during baking due to the combined effect of three factors. That is, although an increase in temperature will reduce coating viscosity prior to crosslinking, the evaporation of the solvent and subsequent crosslinking of the resin will increase the viscosity. Thus, the reduction in viscosity due to an increase in temperature is generally offset by an increase in viscosity due to the loss or evaporation of solvent and an increase in viscosity occurs during curing which reduces sagging.

In contrast to the conventional compositions described above, high solids coating compositions are usually formulated at viscosity levels which are suitable for direct application (i.e., without dilution with solvent). This is done by utilizing low molecular weight resins with their associated low viscosities. Unfortunately, the coatings industry has experienced two major rheological related problems associated with the development of acceptable high solids coating systems. Specifically, significant film sagging on a non-horizontal surface will occur during the heat cure cycle and excessive pigment settling will occur during storage. Unlike conventional systems, the lowering of viscosity with heat far outweighs the rise in viscosity that occurs with evaporation of solvent. This results in a substantial amount of sagging prior to the increase in viscosity upon curing. Such sagging adversely affects the appearance of the cured coating. Furthermore, the presence of a rheological additive in high solids coating compositions is required to prevent pigment settling due to their lower package viscosities.

In paint and coating formulations, both film sagging and pigment settling properties have been adjusted by using thixotropic agents. It is generally recognized that to be effective in high solids coating composition systems, a thixotropic agent must provide for the desired rheological properties while avoiding undesired side effects such as excessive viscosity build-up or gloss reduction of the cured paint film. In this regard, there have been several types of thixotropes which have been used to impart anti-sag and anti-settling properties to high solids systems. These thixotropes include fumed silica, precipitated silica, organomodified clays, basic calcium sulfonate gels, cellulose acetate butyrate and microgels.

The foregoing known thixotropes have significant disadvantages. The use of fumed silica and precipitated silica, in order to achieve effective sag control, leads to a loss of gloss and viscosity levels which are too high. Also, fumed silica and precipitated silica must be added to the grind stage of the paint preparation and cannot be used in a post-addition context. Cellulose acetate butyrate leads to undesirably high viscosity levels of the coating system. Furthermore, because they are highly inefficient, it is necessary to use high levels of microgels which is a serious drawback due to their cost. Basic calcium sulfonate gels, such as those available from Lubrizol Corporation and distributed by Ashland Chemical Company under the tradename IRCOGEL 905, are not very efficient in high solids systems.

Another additive which has been used in an attempt to improve the rheology of high solids coatings is described in U.S. Pat. No. 4,526,910. In particular, the additive comprises inorganic microparticles having surfaces that are substantially free of carbon-containing molecules chemically bonded to the inorganic microparticles.

An organic microgel which is prepared by crosslinking an acrylic resin with a multifunctional crosslinking agent is set forth in U.S. Pat. No. 4,290,932. This additive is used for rheology adjustment in acrylic based high solids paints.

Although the use in the art of the above-described inorganic microparticles and organic microgels have shown rheology improvement for a few high solids systems, when applied generally to high solids systems, such as polyester, acrylic or alkyd resin systems, the effect is very marginal, with some of the additives showing incompatibility.

Despite the numerous types of rheological additives known in the art, an ongoing search has been made for new rheological additives for high solids coating compositions as well as conventional organic solvent-based compositions. The present invention is the result of such an investigation.

OBJECTS AND SUMMARY OF THE INVENTION

It is accordingly a general object of the invention to provide an improved rheological additive for non-aqueous coating compositions.

It is an additional general object of the present invention to provide an improved rheological additive for high solids coating compositions.

It is a further object of the present invention to provide a rheological additive which provides effective anti-sag properties.

It is a further object of the present invention to provide a rheological additive which provides long term storage stability.

It is a further object of the present invention to provide a rheological additive which results in only minimal increases in the application viscosity.

It is a further object of the present invention to provide a rheological additive which has no substantial adverse effect on gloss, fineness of grind and VOC requirements.

It is still a further object of the present invention to provide a rheological additive which is in a pourable liquid form thus allowing for easy handling.

It is still a further object of the present invention to provide a rheological additive which can be easily incorporated at any stage of paint production.

It is still a further object of the present invention to provide a rheological additive which may be used in various commercially available high solids coating compositions.

In one aspect, the present invention provides a rheological additive for non-aqueous coating compositions comprising at least one reaction product of which the reactants comprise: a) alkoxylated aliphatic nitrogen-containing compound and organic polycarboxylic anhydride or acid; b) aliphatic diamine and organic polycarboxylic anhydride or acid; c) alkoxylated aliphatic nitrogen-containing compound and alkane diol polyepoxide ether; and d) aliphatic diamine and alkane diol polyepoxide ether.

In another aspect, the present invention provides a coating composition containing the rheological additive.

Further advantages and features of the invention, as well as the scope, nature and utilization of the invention, will become apparent to those of ordinary skill in the art from the description of the preferred embodiments of the invention set forth below.

DESCRIPTION OF THE PREFERRED EMBODIMENTS

As mentioned above, the present invention provides a rheological additive for various non-aqueous coating compositions. Conventional solvent systems typically contain from about 15 to 45 percent by weight of nonvolatile solids and are illustrated by conventional aromatic bake enamels, such as those based on polyester-melamine, alkyd-melamine, acrylic-melamine, polyester-urea/formaldehyde, alkyd-urea/formaldehyde and acrylic-urea/formaldehyde, or conventional solvent-based paints, such as alkyds (including modified alkyds), epoxies (including epoxy polyamides and epoxy amines), acrylics, urethanes, acrylic urethanes and vinyls (including vinyl chloride-vinyl acetate copolymers).

The rheological additives of the present invention are particularly useful for high solids coating compositions which, for purposes of the present invention are compositions having a nonvolatile solids content of from about 6? to about 100, preferably from about 65 to about 100 and most preferably from about 75 to about 100 percent by weight and correspondingly from about 0 to about 40, preferably from about 0 to about 35 and most preferably from about 0 to about 25 percent by weight of organic solvents. Typical organic solvents include propylene glycol monomethyl ether, butanol, xylene, glycol ethers and esters thereof, various short chain alcohols, ketones, and aromatic, aliphatic and chlorinated hydrocarbons, as is well known in the art. Of course, where the solids content is 100% by weight a solventless system is present wherein no weight loss occurs as the coating cures.

Illustrative high solids coating compositions are high solids baking enamels, such as those based on polyester-melamine, polyester-urea/formaldehyde, alkyd-melamine, alkyd-urea/formaldehyde, acrylic-melamine, acrylic-urea/formaldehyde, epoxies (including epoxy-urea/formaldehyde), polyurethanes (including alkyd and acrylic modified urethanes and uralkyds, urethane acrylates and urethane amide acrylates), and high solids air-dry paints, such as those based on alkyd and acrylic resins (including vinyl toluated alkyds, chain stopped air-dry alkyds and modified alkyds), epoxies (including epoxy/amines and epoxy/amides), oleoresins, polyurethanes, polyvinyl acetates, and vinyl acrylics.

The rheological additive of the present invention comprises at least one reaction product of which the reactants comprise:

(a) alkoxylated aliphatic nitrogen-containing compound and organic polycarboxylic anhydride or acid;

(b) aliphatic diamine and organic polycarboxylic anhydride or acid;

(c) alkoxylated aliphatic nitrogen-containing compound and alkane diol polyepoxide ether; and (d) aliphatic diamine and alkane diol polyepoxide ether.

The alkoxylated aliphatic nitrogen-containing compound can have a chemical structure represented by the following formula:

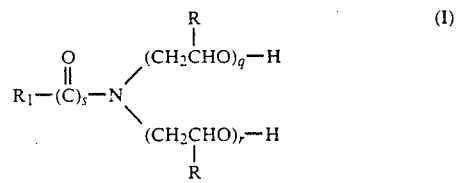

In the formula, $R_1$ is a straight or branched chain aliphatic alkyl group having 6 to 30 carbon atoms, preferably 8 to 20 carbon atoms and most preferably 12 to 18 carbon atoms. Especially preferred is where $R_1$ is a fatty alkyl having 12 to 18 carbon atoms, such as coco, soya, tallow, hydrogenated tallow, oleyl, octadecyl, and mixtures thereof.

R is independently selected and can be a hydrogen, methyl group or ethyl group, both q and r are at least 1, s is 0 or 1, and the sum of $q+r$ is from 2 to 50, preferably from 2 to 15 and most preferably from 2 to 10.

Illustrative alkoxylated aliphatic nitrogen-containing compounds represented by formula (I) include those tertiary amines having one fatty alkyl group derived from various fatty sources having 12 to 18 carbon atoms and at least two polyoxyethylene or polyoxypropylene groups attached to the nitrogen. Polyethoxylated aliphatic amine polyols are commercially available and marketed by Akzo Chemie America Inc. under the trade name Ethomeen while polyethoxylated aliphatic amides are available from the same company under the trade name Ethomid.

The alkoxylated aliphatic nitrogen-containing compound can also have a chemical structure represented by the following formula:

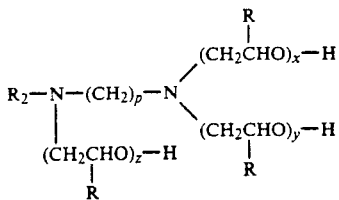

(II)

In the formula, $R_2$ is a straight or branched chain aliphatic alkyl group having 6 to 30 carbon atoms, preferably 8 to 20 carbon atoms and most preferably 12 to 18 carbon atoms. Especially preferred is where $R_2$ is a fatty alkyl having 12 to 18 carbon atoms, such as coco, soya, tallow, hydrogenated tallow, oleyl, octadecyl, and mixtures thereof. The value of p can range from 1 to 20, preferably from 2 to 10 and most preferably from 3 to 5. R has the same meaning used with respect to formula (I). The values of x, y and z are independently selected and can be zero or an integer greater than zero with the sum of $x+y+z$ being from 1 to 50, preferably from 3 to 30 and most preferably from 3 to 15.

Illustrative alkoxylated aliphatic amines represented by formula (II) include those amines obtained from N-alkyl trimethylene diamines and having two polyoxyethylene groups attached to one nitrogen group. Such polyalkoxylated aliphatic diamines are commercially available and marketed by Akzo Chemie America Inc. under the trade name Ethoduomeen.

The aliphatic diamine used in the present invention has the general chemical structure:

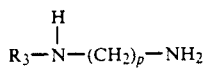

(III)

In the formula, $R_3$ is a straight or branched chain aliphatic alkyl group having 6 to 30 carbon atoms, preferably 8 to 20 carbon atoms and most preferably 12 to 18 carbon atoms.

Especially preferred is where $R_3$ is a fatty alkyl having 12 to 18 carbon atoms, such as coco, soya, tallow, hydrogenated tallow, oleyl, octadecyl, and mixtures thereof. The value of p can range from 1 to 20, preferably 2 to 10 and most preferably 3 to 5.

Illustrative aliphatic diamines represented by formula (III) include those diamines commercially available and marketed by Akzo Chemie America Inc. under the trade name Duomeen.

From the foregoing discussion and formulae, it can be understood that not all aliphatic or aromatic diols and diamines, polyalkoxylated glycols and non-nitrogenated aliphatic alkyls are suitable or desirable in the synthesis of the rheological additives of the present invention. For example, polymethylene diol or polyethylene diamine, polymethylene alcohol amine, polyethylene and polypropylene glycols, and non-nitrogenated aliphatic and aromatic hydrocarbons with two terminal active hydrogens are capable of undergoing a reaction with a polycarboxylic acid or anhydride. However, these reactants detract from the performance of the rheological additives of the present invention such as by causing large viscosity increases in high solids compositions, decreasing anti-sag properties and/or not providing stability to the coating composition over time. Thus, while they may be incorporated in minor amounts, as general guidelines, these reactants should not be present in an amount greater than about 35, preferably not greater than about 25, most preferably not greater than about 10 molar percent of the alkoxylated aliphatic nitrogen-containing compound or aliphatic diamine.

As noted above, the alkoxylated aliphatic nitrogen-containing compound or aliphatic diamine is reacted with organic polycarboxylic anhydride or acid, an alkane diol polyepoxide ether, or mixtures thereof. If a polycarboxylic anhydride or acid is used, various known compounds can be selected. However, it is preferred that a straight, branched, or cyclic aliphatic group or an aryl or an alkyl aryl group be present. Compounds such as the reaction products of vinyl alkyl ether/maleic anhydride, styrene/maleic anhydride, and vinyl acetate/maleic anhydride, glycerol acetate/trimellitic anhydride, and ethylene glycol/trimellitic anhydride can also be used.

It is preferred to use an organic polycarboxylic anhydride with 1-10 carboxylic anhydride groups or its corresponding acid, preferably 1-5 carboxylic anhydride groups or its corresponding acid, and most preferably one with 1-2 carboxylic anhydride groups or its corresponding acid.

Polycarboxylic anhydrides which may be used in the present invention, may be represented by the formula:

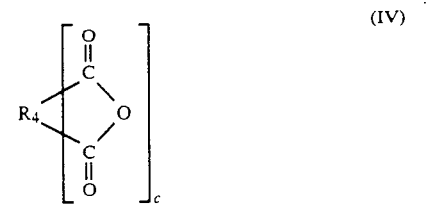

(IV)

wherein $R_4$ is the aforementioned straight, branched or cyclic aliphatic group or aryl group or alkyl aryl group or group which results from olefinic reaction (e.g., styrene/maleic anhydride) or condensation reaction discussed above, c is an integer of from 1–10, preferably 1–5, and most preferably 1–2.

The polycarboxylic acid would have the corresponding formula:

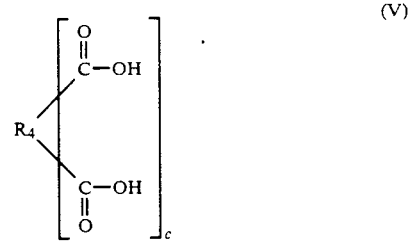

(V)

wherein $R_4$ and c have the same definitions previously stated. However, where polycarboxylic acids are employed, the position of the acid groups may be located anywhere on the $R_4$ group, including positions where anhydride formation does not occur, as long as the acid groups are available for reaction.

Illustrative examples include maleic anhydride or its corresponding acid, phthalic anhydride or its corresponding acid, pyromellitic dianhydride or its corresponding tetra acid, biphenyltetracarboxylic dianhydride or its corresponding tetra acid, benzenophenonetetracarboxylic dianhydride or its corresponding acid, 5-(2,5-dioxotetrahydrofuryl)-3-methyl-3-cyclohexene-1,2 dicarboxylic anhydride or its corresponding acid and the like. Additional polycarboxylic acids include succinic anhydride or its corresponding acid, glutaric anhydride and its corresponding acid, adipic acid, hexane dicarboxylic acid, octane dicarboxylic acid, decane dicarboxylic acid, and mixtures thereof. Of the foregoing compounds, maleic anhydride and its corresponding acid, phthalic anhydride and its corresponding acid, and mixtures thereof are preferred.

It may be more desirable to use an organic olycarboxylic anhydride than its corresponding acid in order to synthesize a useful oligomeric or low molecular weight oligomeric or polymeric rheological additive having an average molecular weight of 500–5000 to provide superior performance when used in high solids coating compositions since anhydrides have been found to react more readily than their corresponding diacids, which means lower reaction temperatures can be employed and the formation of less water as a by-product. However, it has been found that phthalic acid is preferred over phthalic anhydride and that if phthalic anhydride or a like anhydride is used, a small amount of water can be provided.

If an alkane diol polyepoxide ether is reacted with the alkoxylated aliphatic nitrogen-containing compound or aliphatic diamine, it is preferable that it be a straight, branched or cycloaliphatic alkane diol polyepoxide ether having 8 to 48 carbon atoms with 2 to 6 epoxide groups, more preferably one having 8 to 39 carbon atoms with 2 to 4 epoxide groups and most preferably one having 8 to 16 carbon atoms with a diepoxide group such as 1,4-butanediol diglycidyl ether.

Alkane diol polyepoxide ethers which may be used in the present invention can be represented by the formula:

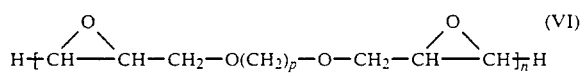

(VI)

wherein p is from 2 to 10, preferably from 2 to 8 and most preferably is 4 and n is from 1 to 3, preferably 1 to 2 and most preferably is 1.

To further enhance the properties (i.e., maintenance of low viscosity in high solids systems and stability) of the rheological additive according to the present invention, an additional reactant may, in some instances, be used in the synthesis. Illustrative examples of such an additional reactant include lactones, lactams, organic carbonates and mixtures thereof. Preferably the additional reactant is a cyclic alkyl lactone and/or lactam having 4 to 10 carbon atoms with a methylene group. Specific examples of such lactones and lactams include epsilon-caprolactone and epsilon-caprolactam. While amounts up to about 50 molar percent of the polycarboxylic anhydride or acid or the alkane diol polyepoxide ether can be substituted by the additional reactant, the amount used should not be so great as to significantly adversely affect the anti-sag properties of the rheological additive. Hence, it is preferred to substitute the additional reactant in amounts not more than about 30 molar percent and more preferably not more than about 20 molar percent As can be understood from the foregoing discussion, any combination of the above-described nitrogen-containing compounds and/or diamines may be used with any combination of the above-described polycarboxylic anhydrides and/or acids or alkane diol polyepoxide ether in the synthesis. When mixtures are used for the nitrogen-containing compounds and/or diamines, the anhydrides and/or acids and the ethers, the ratio of moles of the mixture may be varied depending on the properties desired for the particular intended coating composition. However, the mole ratio between the total amounts of nitrogen-containing compounds and/or diamines and anhydrides and/or acids or nitrogen-containing compounds and/or diamines and ethers is important. That is, the mole ratio between the total amount of the nitrogen-containing compounds and/or diamines to the other reactant used in synthesizing the rheological additive of the present invention should be from about 1.0:5.0 to about 5.0:1.0, preferably from about 1.0:3.0 to about 3.0:1.0 and most preferably from about 1.0:2.0 to about 2.0:1.0.

When an additional reactant such as those described above is used in the production of the rheological additive of the present invention, the mole ratio between the nitrogen-containing compounds and/or diamines, the anhydrides, acids and ethers and the additional reactant should be from about 1.0:2.5:2.5 to about 5.0:0.5:0.5, preferably from about 1.0:1.5:1.5 to about 3.0:0.5:0.5 and most preferably from about 1.0:1.0:1.0 to about 2.0:0.5:0.5. In either situation the specific reactants and ratio selected must yield a rheological additive that is soluble in its intended environment.

The reaction product of the present invention may be synthesized in conventional continuous or batch processes either with or without an organic solvent. When a solvent is used, the two reactants may still form an excellent additive for high solids coating composition in terms of sag resistance and a solvent may be subsequently added, if necessary, depending on the particular use of the product. For example, if a non-solvent product is a solid or non-pourable, the use of a solvent as a carrier may be necessary to produce a fluid product. For use in high solids coating compositions, a preferred physical form of the product is typically a flowable liquid for ease of handling and post addition characteristics. Also, if all or some of the reactants are solids, it may be necessary to use a solvent in order to solubilize the coreactants during synthesis.

When a solvent is used during synthesis, whether or not the organic solvent is polar or non-polar is not particularly critical. However, the preferred solvent for synthesizing a rheological additive of the present invention is a higher methylated ketone such as methylethyl ketone, methylpropyl ketone, methylisobutyl ketone, and methylisoamyl ketone. Although limited only by the particular reactants and reaction conditions, the solvent should generally be used in an amount of from 0 to about 90, preferably from 0 to about 80, and most preferably from 0 to about 50 percent by weight based on the total weight of the reaction mixture.

In those instances where the rheological additive is intended for use with high solids compositions, it is preferred to maintain as low an amount of organic solvent as possible so as to avoid the introduction of additional organic solvent into the composition when the rheological additive is mixed into the high solids composition. Thus, the most preferred form of the rheological additive is a solvent-free pourable liquid.

The reaction temperature to be used in the synthesis may be varied, but preferably ranges from ambient temperature to 300° C. More preferably, the temperature ranges from ambient to 200° C. and most preferably from ambient to 150° C. In some instances, ambient temperature may be the most preferred reaction temperature since certain polyethoxylated amine polyols are so reactive with particular dicarboxylic anhydrides that the reaction takes place at room temperature without heating or a catalyst. An example of such a reaction is the synthesis of the reaction product of maleic anhydride and ETHOMEEN C/20 with a mole ratio of 1.0:2.0.

A catalyst may also be used in the synthesis of the rheological additives of the present invention. If a catalyst is used in the synthesis, it may be selected from any of those typically used in conventional condensation reactions. Examples of such catalysts include tetraalkyl tin or titanium compounds, metal hydrides, sulfuric acid, tin alkyl amines and the like. More preferred are dibutyl tin dilaurate and sodium hydride in mineral oil. Although limited only by the particular reactants and reaction conditions, the catalyst should generally be used in an amount of from about 0.001 to about 2.0 percent by weight based on the total weight of the reactants.

With respect to polyester and polyether syntheses, the mole ratio of the reactants may vary from 1:1. Typically, as the amount of polycarboxylic anhydride or acid that reacts with the alkoxylated aliphatic nitrogen-containing compound or diamine is increased, the molecular weight of the resulting polyester or polyamide increases proportionally indicating a formation of higher molecular weight polymers For example, the weight average molecular weight of the reaction products in a reaction of maleic anhydride:polyethoxylated (10 moles of EO) coco amine (Ethomeen C/20) having a 0.5:1.0, 1.0:1.0 and 2.0:1.0 mole ratio has been observed to be 810, 1200 and 1600, respectively. However, as pointed out above, the molecular weight of the rheological additive cannot be so high as to cause it to be insoluble in the intended coating composition.

The reaction products resulting from the reaction of the reactants may be identified by infrared analysis after volatiles are removed in high temperature ovens. Typically, a strong band for polyamides is observed at 2600 cm$^{-1}$. Two strong bands for the ester carbonyl of COOR and carboxylate of COO are observed at 1725 and 1590 cm$^{-1}$ respectively, for polyester type products. Products derived from alkane diol diepoxide/aliphatic diamine show no trace of an epoxide band in the IR spectrum.

The average molecular weight of the products may be determined by gel permeation chromatography ("GPC") analysis. Typically, bimodal peaks are developed by polyester products yielding monomeric oligomers with a minor amounts of dimer or higher having weight average molecular weights of 700 to 1000. Also, bimodal peaks appear with polyether products in GPC analysis yielding weight average molecular weights ranging from 630-900 indicating mostly a mixture of monomeric oligomer and dimer.

The rheological additive of the present invention preferably has a weight average molecular weight ranging from about 500 to about 5000. In this regard, a mixture of monomeric oligomer and dimer polyester or polyether (MW 700-2000) obtained in accordance with the present invention can provide a minimal viscosity rise in high solid coating compositions The rheological additive of the present invention can be prepared in order to be used with non-aqueous coating materials, more particularly conventional organic solvent based coating materials and high solids coating materials such as those mentioned above. While the reaction products of the previously described alkoxylated aliphatic nitrogen-containing compound and/or aliphatic diamine and the organic polycarboxylic anhydride or acid can be used in conventional organic solvent-based coating compositions in an amount ranging from about 0.01 to about 5.0% solids by weight they typically do not significantly increase the viscosity of the composition and are therefore usually combined with other rheological additives which thicken the composition, such as organophilic clays, and other known materials. Hence, the rheological additive of the present invention is particularly advantageous when used as a rheological additive in a high solids paint such as polyester, alkyd and acrylic resin based melamine baking enamels. When applied to the high solids coating compositions, it is preferable that the additive be used in an amount of from about 0.01 to about 5.0% solids by weight of the total coating system, preferably from about 0.05 to about 2.0% solids by weight and most preferably from about 0.1 to about 1.0% solids by weight of the total coating composition.

The rheological additives of the present invention can provide important advantages in coating compositions. In particular, since high solids coating compositions are typically formulated to be applied without the addition of organic solvent dilution to decrease viscosity, the addition of the rheological additives of the present invention can be added without increasing the viscosity to a point where organic solvent dilution is needed. Yet, the rheological additive serves to inhibit sagging when the coating composition is exposed to higher temperatures such as when the composition is being heat cured.

The rheological additive of the present invention also displays thixotropic properties. This means that a coating composition can be forced through a spray nozzle at relatively low viscosity thereby facilitating application and yet not form drips or runs upon contacting a non-horizontal surface.

To illustrate the beneficial results which may be obtained by the rheological additive of the present invention, when the rheological additive in an amount of 0.3% by weight of the total coating composition is incorporated into a polyester-melamine baking enamel paint, the Leneta sag (as determined by ASTM D4400-84) increases by at least 2 mils, preferably by at least 4 mils over the paint not containing the rheological additive. Furthermore, after aging for 4 months at 25° C., the Leneta sag does not vary from the original value by more than about 5 mils, preferably not more than about 2 mils.

The long term storage stability achieved by the rheological additive can be illustrated by subjecting the aforementioned composition to a viscosity determination using Zahn Cup #4. After storing the composition for 4 months at 25° C., the viscosity does not vary by more than about 10 seconds, preferably not more than 5 seconds.

As additional benefits, the rheological additives of the present invention generally do not substantially adversely affect the gloss or fineness of grind of the original coating composition and display long term storage stability. Some of the rheological additives can also be formulated as a pourable liquid which can be incorporated into a variety of coating materials at various stages of their preparation.

The following inventive Examples and Comparative Examples are presented to illustrate and contrast the resent invention. However, the Examples should not be construed as limiting the invention.

SYNTHESIS OF OLIGOMERIC POLYESTERS

Example 1

Product of Maleic Anhydride:Polyethoxylated Coco Amine With 10 Moles of Oxyethylene To a reaction flask (a three necked round flask having a 250 ml. capacity), equipped with a water condenser, thermometer, nitrogen gas inlet tube, high speed agitator and a heating mantle with an automatic temperature control, 51 g (0.0816 mole) of polyethoxylated coco amine with 10 moles of oxyethylene having a molecular weight of 625, Ethomeen C/20 supplied from Akzo Chemie America Inc. and 80 ml. of methyl isoamyl ketone were charged. After slight agitation, the mixture was homogenized and heated to 100° C.

4.0 g (0.0408 mole) of powdered maleic anhydride was then added and completely dissolved in the Ethomeen C/20:MIAK solution by applying high speed agitation at 110 C. After 0.02 g of dibutyl tin dilaurate was added as a catalyst, the reaction temperature was maintained at 110° C. for 4.0 hours. The reaction flask was blanketed with a nitrogen gas atmosphere with slow nitrogen flow during the reaction.

Upon completion of the reaction, the liquid product was cooled to room temperature. 1.0 to 2.0 g of the sample was taken and dried in a vacuum oven at 80° C. for several hours. The percent concentrate of the liquid product was determined as 54.9%. The mole ratio of the product was 1.0:2.0 for maleic anhydride:Ethomeen C/20.

A product was identified by infrared analysis which showed strong absorption of ester carbonyl (COOR) at 1725 cm$^{-1}$ and carboxylate (COO) at 1590 cm$^{-1}$. By using gel permeation chromatography (GPC) analysis, a bimodal peak was found with one mode of about 15 percent at 1350 and the other of about 85 percent at 720, thus showing a weight average molecular weight of 810.

Example 2

Product of Phthalic Acid:Maleic Anhydride:Diethoxylated Octadecyl Amine

To a reaction flask (a three necked round flask having a 250 ml. capacity), equipped with a water cooled condenser, thermometer, nitrogen gas inlet tube, high speed agitator and heating mantle with automatic temperature control, 14.6 g (0.04 mole) diethoxylated octadecyl amine (Ethomeen 18/12 supplied from Akzo Chemie America Inc. having a molecular weight of 357) and 30 ml. of methyl isoamyl ketone (MIAK) were charged. After slight agitation, the mixture was homogenized and heated to 110° C. A powdered 6.0 g (0.06 mole) sample of maleic anhydride and a 3.3 g (0.02 mole) sample of phthalic acid were added and completely dissolved in the Ethomeen 18/12:MIAK solution at 100° C. by agitation.

After 0.01 g of dibutyl tin dilaurate was added, the reaction temperature was maintained at 100° C. during the reaction for 4.0 hours. The whole reaction system was covered with a nitrogen gas atmosphere for the entire reaction period.

Upon completion of the reaction, the liquid product was cooled to room temperature. A 1.0 to 2.0 g sample of the product was then dried in a vacuum oven at 80° C. for several hours. The percent concentrate of the product was determined as 48.6%. The mole ratio of the product was 0.5:1.5:1.0 for phthalic acid:maleic anhydride:Ethomeen 18/12.

Infrared spectra showed two strong bands of ester carbonyl (COOR) at 1725 cm$^{-1}$ and carboxylate (COO$^-$) at 1590 cm$^{-1}$. Beside these bands, there was a broad absorption band at 2600 cm$^{-1}$. In GPC analysis, an average weight molecular weight of 917 with a trimodal distribution was obtained. This analysis indicates that the product may have a majority of dimer structure.

Examples 3-27

Oligomeric or Low Molecular Weight Polyesters

Various oligomeric or low molecular weight polyesters of maleic, or other tetracarboxylic anhydrides or phthalic acid, phthalic acid and maleic anhydride with polyethoxylated aliphatic amines were prepared according to the synthesis method detailed in Examples 1 and 2. The results are listed in Table 1. Table 1 describes product composition, the mole ratio of coreactants, solvent and percent solid concentrate.

TABLE 1

PRODUCTS OF OLIGOMERIC OR LOW MOLECULAR WEIGHT POLYESTERS

| Example Number | Product Composition | Solvent | Percent Concentrate |
|---|---|---|---|
| 3 | MA:Ethomeen C/15 (1.0:1.0) | MIAK | 52.0 |
| 4 | MA:Ethomeen C/20 (1.0:1.0) | MIAK | 55.5 |
| 5 | MA:Ethomeen C/20 (0.5:1.0) | MIAK | 55.0 |
| 6 | MA:Ethomeen 18/15 (1.5:1.0) | MIAK | 50.0 |
| 7 | MA:Ethomeen C/12 (0.75:1.0) | MIAK | 37.2 |
| 8 | PA:Ethomeen T/20 (2.0:1.0) | MIAK | 47.5 |
| 9 | PA:Ethoduomeen T/25 (1.0:1.0) | MIAK | 52.0 |
| 10 | MA:Ethoduomeen T/13 (1.25:1.0) | MIAK | 49.7 |
| 11 | MA:Ethoduomeen T/20 (1.0:1.0) | MIAK | 56.5 |
| 12 | PA:MA:Ethomeen C/20 (0.75:0.75:1.0) | MIAK | 47.6 |
| 13 | PA:MA:Ethomeen 18/20 (0.75:0.25:1.0) | MIAK | 50.4 |
| 14 | MA:Caprolactone:Ethomeen C/15 (1.0:1.0:1.0) | MIAK | 51.3 |
| 15 | PA:MA:Ethomeen 18/12 (0.25:1.25:1.0) | MIAK | 47.2 |
| 16 | PA:MA:Ethomeen 18/12 (0.75:0.75:1.0) | MIAK | 46.6 |
| 17 | PA:MA:Ethomeen 18/12 (0.5:1.25:1.0) | MIAK | 48.4 |
| 18 | PA:MA:Ethomeen 18/12 (0.75:1.0:1.0) | MIAK | 49.1 |
| 19 | PA:MA:Ethomeen 18/12 (0.5:1.5:1.0) | MIAK | 55.0 |
| 20 | PMDA:Ethomeen 18/20/ED600 (1.0:1.2:0.25) | MPK | 44.4 |
| 21 | B-4400:Ethoduomeen T/20 (0.8:1.0) | MPK | 38.7 |
| 22 | B-4400:Ethoduomeen T/20 (0.8:1.0) | MIAK | 37.3 |

TABLE 1-continued

PRODUCTS OF OLIGOMERIC OR LOW MOLECULAR WEIGHT POLYESTERS

| Example Number | Product Composition | Solvent | Percent Concentrate |
|---|---|---|---|
| 23 | PMDA:Ethomeen 18/15 (0.7:1.0) | MPK | 38.1 |
| 24 | PMDA:Ethomeen C/20 (0.6:1.0) | MIAK | 54.0 |
| 25 | BPTCA:Ethoduomeen T/20 (0.57:1.0) | MPK | 53.9 |
| 26 | B-4400:Ethomeen C/20 (0.6:1.0) | MPK | 49.2 |
| 27 | B-4400:Ethomeen 18/20 (0.7:1.0) | MPK | 48.1 |

Reactants

| | |
|---|---|
| Ethomeen C/12, C/15 and C/20 | Polyethoxylated coco amines with oxyethylene moles of 2, 5 and 10 |
| Ethomeen 18/12, 18/15/and 18/20 | Polyethoxylated octadecyl amines with oxyethylene moles of 2, 5 and 10 |
| Ethoduomeen T/13, T/20 and T/25 | Polyethoxylated tallow 1,3 propane diamines with oxyethylene moles of 3, 10 and 15 |
| MA | Maleic anhydride |
| PA | Phthalic acid |
| PMDA | Pyromellitic dianhydride |
| B-4400 | Epiclon B-4400 available from Dainippon Ink & Chemicals, Inc. 5-(2,5 dioxotetrahydrofuryl)-3-methyl 3-cyclohexene-1,2 dicarboxylic anhydride |
| ED600 | Jeffamine, polyoxyalkeneamine with 600 molecular weight, available from Texaco, Inc. |
| BPTCA | 3,3',4,4'-Benzophenonetetracarboxylic Dianhydride |

Solvent

| | |
|---|---|
| MIAK | Methyl isoamyl ketone |
| MPK | Methyl propyl ketone. |

Example 28

Product of Maleic Anhydride:N-coco-1,3-diaminopropane

To a reaction flask (a three necked round flask having a 250 ml. capacity), equipped with a water cooled condenser, thermometer, nitrogen gas inlet tube, high speed agitator and a heating mantle with an automatic temperature control, a 20.3 g sample (0.07 mole) of N-coco-1,3-diaminopropane (Duomeen C supplied from Akzo Chemie America Inc. having a molecular weight of 290) and a 40 ml. sample of methyl isoamyl ketone (MIAK) were charged. The reaction system was blanketed with nitrogen gas flow. A powdered 10.3 g (..105 mole) sample of maleic anhydride was then added. Some exothermic heat was noted raising the temperature to 80° C. upon the addition of maleic anhydride and the color of the solution darkened to orange from yellow. 0.007 g of dibutyl tin dilaurate was then added and the solution was heated to 110° C. for 4.0 hours. The color of the solution continued to darken.

Upon completion of the reaction, the liquid was transferred into a glass jar while hot (90° C.) due to the high viscosity. A 55.0 percent solids of the product was obtained by drying a very small amount (1 to 2 g) of the sample in a hot oven. The mole ratio of the product was 1.5:1.0 for maleic anhydride:N-coco-1,3-diaminopropane.

Example 29

Product of Maleic Anhydride:Diethoxylated Coco Amine:N-tallow-1,3-diaminopropane To a reaction flask (a three necked round flask having a 250 ml. capacity), equipped with a water cooled condenser, thermometer, nitrogen inlet tube, high speed agitator, and a heating mantle with an automatic temperature control, a 21.88 g (0.08 mole) sample of a diethoxylated coco amine (Ethomeen C/12), 7.2 g (0.02 mole) of N-tallow-1,3-diaminopropane (Duomeen T) and 40 ml. of methyl isoamyl ketone (MIAK) were charged. The whole reaction system was then covered with nitrogen gas from a nitrogen gas flow. The charged reactant solution was heated to 50° C. in order to insure the complete dissolution of Duomeen T and some exotherm (35°) was noted during this period.

10 g (0.1 mole) of powdered maleic anhydride was then added. After 0.0007 g dibutyl tin dilaurate was added, the solution was heated to 100° C. and maintained for 4.0 hours. The solution steadily darkened and the viscosity of the solution increased.

Upon completion of the reaction, the liquid product was cooled to 40° C. and transferred into a glass jar. A 53.5 percent solid concentrate of the product was obtained by drying a small amount (1 to 2 g) of the sample in a hot oven. The mole ratio of the liquid product was 1.0:0.8:0.2 for maleic anhydride:diethoxylated coco amine:N-tallow-1,3-diaminopropane.

Examples 30-36

Using the equipment and reaction conditions of Example 29, additional reactions were prepared as summarized in Table 2:

TABLE 2

PRODUCTS OF OLIGOMERIC OR LOW MOLECULAR WEIGHT POLYAMIDES AND MIXED POLYAMIDES/POLYESTERS

| Example Number | Product Composition | Solvent | Percent Concentrate |
|---|---|---|---|
| 30 | MA:Duomeen L8D (1.5:1.0) | MIAK | 64.5 |
| 31 | MA:Duomeen T (1.5:1.0) | MIAK | 49.0 |
| 32 | MA:Ethomeen C/12:Duomeen L8D (1.0:0.8:0.2) | MIAK | 53.0 |
| 33 | MA:Ethomeen C/12:Duomeen C (1.0:0.9:0.1) | MIAK | 54.5 |
| 34 | MA:Ethomeen 18/12:Duomeen C (1.0:0.85:0.05) | MIAK | 61.0 |
| 35 | MA:Ethomeen C/15:Duomeen L8D (1.5:0.7:0.3) | MIAK | 60.0 |
| 36 | MA:Ethomeen 18/12:Duomeen L8D (1.5:0.7:0.3) | MIAK | 63.5 |

| | |
|---|---|
| MA | Maleic anhydride |
| Ethomeen C/12 and C/15 | Polyethoxylated coco amines with oxyethylene moles of 2 and 5 |
| Ethomeen 18/12 & 18/20 | Polyethoxylated octadecyl amines with oxyethylene moles of 2 and 10 |
| Ethoduomeen T/13 and T/20 | Polyethoxylated N-tallow-1,3-diaminopropane with oxyethylene moles of 3 and 10 |
| Propomeen C/12 | Dipropoxylated coco amine |
| Propoduomeen T/13 | Tripropoxylated N-tallow-1,3-diaminopropane |
| Duomeen L8D, C or T | N-Ethyl hexyl, N-coco or N-tallow-1,3-diaminopropane |

SYNTHESIS OF OLIGOMERIC OR LOW MOLECULAR WEIGHT POLYESTERS FROM THE REACTION OF POLYETHER EPOXIDES AND AMINES

Example 37

Product of Ethylhexyl 1,3 Propane Diamine:Butane Diol Diglycidyl Ether

To a reaction flask (a three necked round flask having a 250 ml. capacity) equipped with a water cooled condenser thermometer, nitrogen gas inlet tube, high speed agitator and a heating mantle with an automatic temperature control, a 9.2 g (0.05 mole) sample of N-ethylhexyl-1,3-diaminopropane (Duomeen L8D supplied from Akzo Chemie America Inc. having a molecular weight of 186), and 8.0 g (0.04 mole) 1,4-butane diol diglycidyl ether (BDGE) available from Aldrich Chemical, and 30 ml. of methyl propyl ketone (MPK), were charged. The reaction system was blanketed with a nitrogen gas flow. The solution was then heated to 95° C. and maintained at 95° C. for 4.0 hours after adding 0.01 g of sodium hydride (dispersed in 60% mineral oil) as a catalyst. The color of solution gradually turned to yellow.

The liquid product was cooled to room temperature and then filtered through a fine screen (about 200 mesh) in order to remove insoluble sodium compounds which may have formed, if any. The percent concentrate was then determined by drying a small amount (1 to 2 g) of the sample in a hot oven, thereby removing volatiles completely. A concentrate of 47.8 percent was obtained.

By infrared analysis, a product was identified showing no trace of an epoxide group, with a primary and secondary amine structure. By GPC analysis, the weight average molecular weight of the liquid polymer was found to be 830.

SYNTHESIS OF COMPARATIVE OLIGOMERIC OR LOW MOLECULAR WEIGHT POLYMERS WITH POLYETHER DIOLS CONTAINING NO NITROGEN AND POLYOXYALKYLENEAMINE

Examples 38-42

For comparative purposes, several products were prepared using the same procedure described in Example 1, but using non-nitrogenated polyether diols such as polyethylene glycols and polyoxyalkyleneamine, with polycarboxylic anhydrides.

TABLE 3

PRODUCTS OF OLIGOMERIC OR LOW MOLECULAR WEIGHT POLYMERS WITH NON-NITROGENATED POLYETHER DIOLS AND POLYALKYLENEAMINES

| Comparative Example Number | Product Composition | Solvent | Percent Concentrate |
|---|---|---|---|
| 38 | PA:PEG 600 (1.0:1.0) | MIAK | 57.3 |
| 39 | Epiclon B-4400:PEG 600 (0.5:1.0) | MIAK | 70.0 |
| 40 | PMDA:PEG 600 (0.25:1.0) | MIAK | 50.4 |
| 41 | PMDA:PEG 1000 (0.80:1.0) | MPK | 50.8 |
| 42 | PMDA:Jeffamine ED 600 (0.6:1.0) | MPK | 44.4 |

| | |
|---|---|
| PA | Phthalic acid |
| Epiclon B-4400 | 5-(2,5 dioxotetrahydrofuryl)-3-methyl-3-cyclohexene-1,2-dicarboxylic anhydride available from Dainippon Ink & Chemicals, Inc. |
| PMDA | Pyromellitic dianhydride |
| PEG 600 & 1000 | Polyethylene glycols with molecular weights of 600 and 1000 |
| Jeffamine ED 600 | Polyethoxylated alkylenediamine with a molecular weight of 600 available from Texaco, Inc. |

SYNTHESIS OF OLIGOMERIC POLYESTERS

Examples 43-48

Various oligomeric polyesters of maleic acid, phthalic acid, or 1,10-decanedicarboxylic acid with polyethoxylated amine polyols were prepared according to the synthesis method detailed in Examples 1 and 2. The results are listed in Table 4. This Table describes product composition, the mole ratio of coreactants, reaction temperatures employed, solvent, and percent solids concentrate.

TABLE 4

PRODUCTS OF OLIGOMERIC POLYESTERS WITH ORGANIC DIACIDS

| Example Number | Product Composition | Reaction Temp. °C. | Solvent | Percent Concentrate |
|---|---|---|---|---|
| 43 | Maleic Acid: Ethomeen C/20 (1.0:1.0) | 110 | None | 100 |
| 44 | Phthalic Acid: Ethomeen C/20 (1.0:1.0) | 110 | None | 100 |
| 45 | 1,10-decanedicarboxylic acid: Ethomeen C/20 (1.0:1.0) | 180 | None | 100 |
| 46 | Maleic Acid: Ethomeen 18/12 (1.0:1.0) | 110 | MIAK | 80 |
| 47 | Maleic Acid: Ethomeen 18/12 (1.0:1.0) | 170 | Cyclohexanone | 74.5 |
| 48 | Maleic Acid: Ethoduomeen T/20 (1.0:1.0) | 110 | None | 100 |

PREPARATION OF PAINT AND PAINT TESTING PROCEDURE

Examples are set forth below to demonstrate the utility of the preferred oligomeric or low molecular weight polymers which are prepared in accordance with the procedures described in Examples 1-48, as a sag resistant rheological agent for high solids paints, particularly pigmented polyester, alkyd and acrylic resin based baking enamel paints.

A polyester resin based baking enamel high solids paint was prepared by mixing the ingredients listed in Formulation A in the order in which they appear, for the standard testing of the product. The ingredients were mixed using a one horsepower (hp) high speed disperser equipped with a 2½" diameter disperser blade.

The liquid form of the rheological additive of the present invention may be added in a high solids paint in a variety of ways such as (1) adding at the grinding stage before e.g., TiO$_2$ pigment is added, (2) adding at letdown and (3) adding as a post-addition agent after the paint is completely made. Using the post-addition method, a masterbatch technique may be used. For example, a large quantity of polyester-melamine baking enamel may be prepared without the rheological additive. The prepared masterbatch may then be equally divided into small portions (600 grams) to prepare each paint for polymer evaluation. Then, 0.5-10.0 grams of polymer solids, excluding solvent which is equivalent to 1.0-20.0 pounds loading per 100 gallons, may be added into the 600 grams masterbatch paint in a pint sized paint can. The mixture may then be stirred using a Lightnin' mixer at 1200 rpm for 2 minutes.

In the case where the rheological additive is added at the grinding stage, it is necessary to check pigment dispersion. The fineness of grind as a measure of the degree of dispersion may be determined by a Hegman gauge. After aging the paint on the shelf overnight (i.e., 24 hours), the paint properties of fineness of grind, Zahn Cup #4 viscosity, Brookfield viscosity, Stormer viscosity, and sag resistance at room temperature and 350° F. may be measured.

The properties of the paint prepared by the formulation described in Formulation A were analyzed in accordance with a number of different test procedures as follows:

(1) Fineness of grind was measured in Hegman units using a Hegman gauge in accordance with ASTM D 1210-79.

(2) Zahn Cup #4 viscosity was measured in seconds with a Zahn Cup #4 instrument in accordance with ASTM D 3794-79.

(3) Brookfield viscosities at 10 and 100 rpm were measured with a RVT model of Brookfield viscometer in accordance with ASTM D 2196-81. From viscosity data, a Thixotropic Index (TI) was obtained as follows:

$$\text{Thixotropic Index } (TI) = \frac{\text{Viscosity at 10 rpm}}{\text{Viscosity at 100 rpm}}$$

(4) Stormer viscosities were measured in Krebs Units (KU) with a Thomas Stormer Instrument, Model #09730-G15, in accordance with ATM D562-81.

(5) Sag resistance was measured in mils using a Leneta sag multinotch applicator at room temperature and 350° F. after 15 minutes for thermal sag resistance in accordance with ASTM D 4400-84.

(6) Stability of the paint was tested by storing each sample of paint for a period of four months at room temperature (e.g., 70° F.). At the end of the aging period, each sample was examined for appearance, Zahn Cup #4 viscosity, Brookfield viscosity, Stormer viscosity sag resistance at room temperature and 350° F. and other properties, if desired.

If the paint gained more than 10 seconds of Zahn Cup #4 viscosity and/or lost more than 5 mils of sag resistance due to aging, testing on aging was usually terminated.

Comparative Example 1

Preparation of Polyester Based Baking Enamel Paint Without Rheological Additive

A portion (600 grams) of the polyester-melamine baking enamel masterbatch paint described above was prepared without any additive, and was tested for paint properties. The paint properties obtained from the procedure are set forth in Table 5.

Comparative Example 2

Preparation of Polyester Based Baking Enamel Paint Containing Fumed Silica

A small portion of the polyester-melamine baking enamel masterbatch paitt (total 600 grams in a pint size paint can) was prepared and 3.0 grams of solid Cab-O-Sil M5 (available from Cabot Corporation) was added at the grinding stage. The paint properties which were obtained are set forth in Table 5. Cab-O-Sil is a tradename representing fumed silica. The additive loading was equivalent to 3.0 pounds/100 gallons.

Comparative Example 3

Preparation of Polyester Based Baking Enamel Paint Containing Calcium Sulfonate Gel 4.84 grams of 62% concentrated liquid IRCOGEL 905 (equivalent to 3.0 pounds/100 gallons) was added to a portion (600 grams) of the polyester-melamine baking enamel masterbatch paint prepared without any additive. IRCOGEL 905 is a calcium sulfonate gel available from Lubrizol Corporation and distributed by Ashland Chemical Corporation. The paint properties which were obtained are presented in Table 5.

Examples 101–148

Preparation of Polyester Based High Solids Baking Enamel Paint

The same procedures described in Comparative Example #3 were repeated except that the liquid products listed in Examples 1–48, were substituted for IRCOGEL 905. The additive loading on an active solids basis (excluding solvent) was 3.0 pounds/100 gallons. The properties of the resulting paints are set forth in Table 5.

Thus, the polyester-melamine baking enamel masterbatch paint serves as a standard formulation into which the product additives of Examples 1–48, including the additives of Comparative Example 2 (introduced at the grind stage) and Comparative Example 3 are added. In this regard, it will be noted that the amount of subject liquid additive may be adjusted to give a rheological additive solids content of 3.0 pounds/100 gallons of formulation with the exception of Example 137 which had a rheological additive solids content of 2.0 pounds/100 gallons of formulation.

| FORMULATION A: HIGH SOLIDS POLYESTER-MELAMINE BAKING ENAMEL | | | |
|---|---|---|---|
| Ingredient | Generic Name | Manufacturer | Pounds[1] |
| AROPLAZ 6755-A6-80 | High Solids Polyester Resin | NL Chemicals, Inc. | 168.14 |
| n-Butanol | n-Butanol | Ashland Chemical | 21.02 |
| Arcosolv PM Acetate | Propylene Glycol Monomethyl Ether Acetate | ARCO Chemical Company | 63.05 |
| Titanox 2020 | Titanium Dioxide | NL Chemicals, Inc. | 420.36 |
| Disperse at high speed for 15 minutes. | | | |
| AROPLAZ 6755-A6-80 | High Solids Polyester Resin | NL Chemicals, Inc. | 291.63 |
| Cymel 303 | Hexamethoxymethyl-melamine Resin | American Cyanamid | 157.64 |
| CYCAT 4040 | Paratoluene Sulfonic Acid | American Cyanamid | 3.96 |
| Fluorad FC-430 (50% in xylene) | Fluorocarbons | 3M Corporation | 1.58 |
| MEK | Methyl Ethyl Ketone | Ashland Chemical | 35.03 |
| Arcosolv PM Acetate | Propylene Glycol Monomethyl Ether Acetate | ARCO Chemical Company | 35.03 |
| Total (without the Rheological Additive) | | | 1197.44 |

[1]Basic formulation: test composition may be prepared with different amounts, but proportional to those set forth.

TABLE 5

| PROPERTIES OF POLYESTER RESIN BASED HIGH SOLID BAKING ENAMEL PAINT | | | | | | | | | |
|---|---|---|---|---|---|---|---|---|---|
| Example Number | Additive Example Number | Loading (lbs./Hg) | FOG | Zahn Cup #4 Visc. (sec) | Brookfield Visc. (cP) 10 rpm | 100 rpm | TI | Sag (mils) RT | 350° F. |
| Comp. Ex. 1 | None | 0 | 7A | 17 | 244 | 301 | 0.81 | 5.5 | 3.5 |
| Comp. Ex. 2 | Cab-O-Sil M5 | 3.0 | 7B | 23 | 350 | 410 | 0.85 | 5.0 | 4.0 |
| Comp. Ex. 3 | IRCOGEL 905 | 3.0 | 7B | 23 | 335 | 411 | 0.82 | 6.0 | 4.0 |
| 101 | 1 | 3.0 | 7A | 25 | 760 | 570 | 1.33 | 7.0 | 7.0 |
| 102 | 2 | 3.0 | 7A | 26 | 2020 | 720 | 2.81 | 14.0 | 14.0 |
| 103 | 3 | 3.0 | 7A | 24 | 760 | 494 | 1.54 | 8.0 | 8.0 |
| 104 | 4 | 3.0 | 7A | 20 | 620 | 450 | 1.38 | 6.0 | 6.0 |
| 105 | 5 | 3.0 | 7A | 22 | 544 | 486 | 1.17 | 6.0 | 6.0 |
| 106 | 6 | 3.0 | 7A | 27 | 1240 | 640 | 1.94 | 9.0 | 9.0 |
| 107 | 7 | 3.0 | 7B | 20 | 820 | 440 | 1.86 | 6.0 | 6.0 |
| 108 | 8 | 3.0 | 7B | 20 | 440 | 410 | 1.07 | 6.0 | 6.0 |
| 109 | 9 | 3.0 | 6.5B | 22 | 480 | 436 | 1.10 | 6.0 | 6.0 |
| 110 | 10 | 3.0 | 7A | 25 | 1550 | 625 | 2.48 | 12.0 | 12.0 |
| 111 | 11 | 3.0 | 7A | 27 | 600 | 560 | 1.07 | 6.0 | 6.0 |
| 112 | 12 | 3.0 | 7A | 22 | 720 | 490 | 1.47 | 7.0 | 6.0 |
| 113 | 13 | 3.0 | 7A | 23 | 760 | 530 | 1.43 | 7.0 | 7.0 |
| 114 | 14 | 3.0 | 7A | 22 | 900 | 610 | 1.48 | 6.0 | 6.0 |
| 115 | 15 | 3.0 | 7A | 25 | 2000 | 720 | 2.78 | 16.0 | 14.0 |
| 116 | 16 | 3.0 | 7A | 23 | 1120 | 550 | 2.04 | 8.0 | 7.0 |
| 117 | 17 | 3.0 | 7A | 24 | 1740 | 660 | 2.64 | 16.0 | 14.0 |
| 118 | 18 | 3.0 | 7A | 24 | 1480 | 610 | 2.43 | 10.0 | 9.0 |
| 119 | 19 | 3.0 | 7A | 27 | 2060 | 750 | 2.15 | 16.0 | 16.0 |
| 120 | 20 | 3.0 | 7A | 23 | 1004 | 580 | 1.73 | 7.0 | 7.0 |
| 121 | 21 | 3.0 | 7A | 25 | 880 | 605 | 1.45 | 6.0 | 6.0 |
| 122 | 22 | 3.0 | 7A | 24 | 920 | 630 | 1.46 | 8.0 | 8.0 |
| 123 | 23 | 3.0 | 6.5B | 23.5 | 1620 | 674 | 2.4 | 14.0 | 14.0 |

TABLE 5-continued

PROPERTIES OF POLYESTER RESIN BASED HIGH SOLID BAKING ENAMEL PAINT

| Example Number | Additive Example Number | Loading (lbs./Hg) | FOG | Zahn Cup #4 Visc. (sec) | Brookfield Visc. (cP) | | TI | Sag (mils) | |
|---|---|---|---|---|---|---|---|---|---|
| | | | | | 10 rpm | 100 rpm | | RT | 350° F. |
| 124 | 24 | 3.0 | 6B | 26 | 1020 | 605 | 1.69 | 7.0 | 7.0 |
| 125 | 25 | 3.0 | 7B | 24 | 620 | 482 | 1.29 | 7.0 | 7.0 |
| 126 | 26 | 3.0 | 7A | 25 | 950 | 580 | 1.66 | 8.0 | 7.0 |
| 127 | 27 | 3.0 | 7A | 23 | 960 | 615 | 1.56 | 6.0 | 6.0 |
| 128 | 28 | 3.0 | 7B | 25 | 520 | 430 | 1.21 | 8.0 | 7.0 |
| 129 | 29 | 3.0 | 7A | 27 | 1450 | 650 | 2.23 | 12.0 | 6.0 |
| 130 | 30 | 3.0 | 7B | 25 | 760 | 490 | 1.55 | 7.0 | 7.0 |
| 131 | 31 | 3.0 | 7B | 25 | 360 | 375 | 0.96 | 6.0 | 6.0 |
| 132 | 32 | 3.0 | 7A | 25 | 1050 | 585 | 1.79 | 9.0 | 9.0 |
| 133 | 33 | 3.0 | 7A | 24 | 750 | 505 | 1.49 | 8.0 | 8.0 |
| 134 | 34 | 3.0 | 7A | 27 | 1560 | 690 | 2.26 | 14.0 | 14.0 |
| 135 | 35 | 3.0 | 7A | 29 | 1100 | 590 | 1.86 | 10.0 | 10.0 |
| 136 | 36 | 3.0 | 7A | 28 | 1650 | 610 | 2.70 | 12.0 | 12.0 |
| 137 | 37 | 2.0 | 7A | 20 | 540 | 450 | 1.20 | 6.0 | 6.0 |
| 138 | 38 | 3.0 | 7A | 25 | 420 | 475 | 0.88 | 6.0 | 4.0 |
| 139 | 39 | 3.0 | 6.5B | 15 | 240 | 265 | 0.9 | 4.0 | 4.0 |
| 140 | 40 | 3.0 | 7A | 21 | 400 | 455 | 0.88 | 6.0 | 4.0 |
| 141 | 41 | 3.0 | 6.5B | 20 | 270 | 350 | 0.77 | 6.0 | 4.0 |
| 142 | 42 | 3.0 | 6B | 77 | 4960 | 1870 | 2.65 | 16.0 | 14.0 |
| 143 | 43 | 3.0 | 7A | 29 | 890 | 575 | 1.55 | 8.0 | 8.0 |
| 144 | 44 | 3.0 | 7A | 26 | 490 | 480 | 1.02 | 6.0 | 6.0 |
| 145 | 45 | 3.0 | 7A | 21 | 360 | 362 | 0.99 | 7.0 | 7.0 |
| 146 | 46 | 3.0 | 6.5A | 30 | 1600 | 690 | 2.32 | 14.0 | 12.0 |
| 147 | 47 | 3.0 | 6.5A | 29 | 2150 | 775 | 2.77 | 14.0 | 14.0 |
| 148 | 48 | 3.0 | 7A | 29 | 600 | 570 | 1.05 | 6.0 | 6.0 |

As may be seen from the data set forth above, the rheological additives of the present invention described in the Examples are effective paint additives yielding excellent paint properties of antisagging, low viscosity, and high thixotropic index compared to those comparative products made with non-nitrogenated polyether diols which are listed in Table 3. Furthermore, as indicated in Table 5, the thermal sag resistance properties of Comparative Examples 2 and 3, and Examples 138-142 appear to result in unacceptably low sag values or high Zahn Cup #4 and Brookfield viscosities in the high solids paint. Therefore, it can be seen that the rheological additives of the present invention described in the Examples provide greater advantages in antisagging with low viscosity maintenance, TI and dispersion properties in high solids baking enamel paint.

Examples 149 and 150 and Comparative Examples 4-6

The polyester based high solid baking enamel paint described in Formulation B was used to test the rheological additives prepared in accordance with Examples 1 and 2, a Control example (Comparative Example 4) and two comparative additives (Comparative Examples 5 and 6). The additives were added to the paint using the post-addition method previously described with the exception of the additive of Comparative Example 5 which was added during the grind stage of the paint preparation. The additive loading was adjusted to obtain a 3.0 pounds/100 gallon solids loading of the rheological additive. The paint properties were tested in accordance with procedures described previously and are summarized in Table 6.

| FORMULATION B: WHITE HIGH SOLIDS POLYESTER-MELAMINE ENAMEL | | | |
|---|---|---|---|
| Ingredient | Generic Name | Manufacturer | Pounds[1] |
| Titanox 2020 | Titanium Dioxide | NL Chemicals, Inc. | 423.60 |
| XP-5457 (85% non-volatiles) | High Solids Polyester Resin | NL Chemicals, Inc. | 169.44 |
| n-Butanol | n-Butanol | Ashland Chemical | 21.18 |
| Arcosolv PM Acetate | Propylene Glycol Mono Methyl Ether Acetate | Arco Chemical Company | 63.54 |
| Disperse to 7.0 N.S. (Hegman Grind) | | | |
| XP-5457 | High Solids Polyester Resin | NL Chemicals, Inc. | 266.62 |
| Cymel 303 | Hexamethoxy melamine Resin | American Cyanamid | 158.85 |
| CYCAT 4040 | Paratoluene Sulfonic Acid | American Cyanamid | 3.99 |
| Fluorad FC-430 (50% in xylene) | Fluorocarbons | 3M Corporation | 0.71 |
| MEK | Methyl Ethyl Ketone | Ashland Chemical | 35.3 |
| Arcosolv PM Acetate | Propylene Glycol Mono Methyl Ether Acetate | Arco Chemical Company | 35.3 |

-continued

| FORMULATION B: WHITE HIGH SOLIDS POLYESTER-MELAMINE ENAMEL | | | |
|---|---|---|---|
| Ingredient | Generic Name | Manufacturer | Pounds[1] |
| | Total (without rheological additive) | | 1178.53 |

[1]Basic formulation; test composition may be prepared with different amounts, but proportional to those set forth.

TABLE 6

| Example Number | Additive Example Number | Loading (lbs./Hg) | FOG | Zahn Cup #4 Visc. (sec) | Brookfield Visc. (cP) 10 rpm | Brookfield Visc. (cP) 100 rpm | TI | Sag (mils) RT | Sag (mils) 350° F. |
|---|---|---|---|---|---|---|---|---|---|
| 149 | 1 | 3.0 | 7A | 16 | 260 | 259 | 1.0 | 6.0 | 6.0 |
| 150 | 2 | 3.0 | 7A | 18 | 2100 | 575 | 3.65 | 14.0 | 14.0 |
| Comp. Ex. 4 | None | 0 | 6A | 13 | 180 | 204 | 0.88 | 3.5 | 2.5 |
| Comp. Ex. 5 | Cab-O-Sil M5 | 3.0 | 7A | 19 | 350 | 335 | 1.04 | 4.5 | 3.5 |
| Comp. Ex. 6 | IRCOGEL 905 | 3.0 | 7A | 14 | 260 | 230 | 1.13 | 6.0 | 4.0 |

Examples 151 and 152 and Comparative Examples 7–9 were tested in accordance with procedures described previously and are summarized in Table 7.

| FORMULATION C: HIGH SOLIDS ACRYLIC-MELAMINE BAKING ENAMEL | | | |
|---|---|---|---|
| Ingredient | Generic Name | Manufacturer | Pounds[1] |
| Joncryl 500 | Acrylic Resin | S. C. Johnson | 254.9 |
| n-Butanol | n-Butanol | Ashland Chemical | 12.0 |
| Titanox 2020 | Titanium Dioxide | NL Chemicals, Inc. | 397.03 |
| Disperse at high speed for 15 minutes. | | | |
| Joncryl 500 | Acrylic Resin | S. C. Johnson | 169.9 |
| Cymel 303 | Hexamethoxymethyl-melamine | American Cyanamid | 145.7 |
| n-Butanol | n-Butanol | Ashland Chemical | 123.9 |
| Paint Additive 57 (10% in butanol) | Proprietary | Dow Chemicals | 4.8 |
| CYCAT 4040 | Paratoluene Sulfonic Acid | American Cyanamid | 6.1 |
| MEK | Methyl Ethyl Ketone | Ashland Chemical | 25.4 |
| | | Total (without rheological additive) | 1139.73 |

[1]Basic formulation; test composition may be prepared with different amounts, but proportional to those set forth.

TABLE 7

| Example Number | Additive Example Number | Loading (lbs./Hg) | FOG | Zahn Cup #4 Visc. (sec) | Brookfield Visc. (cP) 10 rpm | Brookfield Visc. (cP) 100 rpm | TI | Sag (mils) RT | Sag (mils) 350° F. |
|---|---|---|---|---|---|---|---|---|---|
| 151 | 1 | 3.0 | 7A | 19 | 320 | 324 | 0.99 | 5.0 | 5.0 |
| 152 | 2 | 3.0 | 7A | 19 | 375 | 300 | 1.25 | 5.0 | 5.0 |
| Comp. Ex. 7 | None | 0 | 7A | 13 | 156 | 228 | 0.68 | 3.0 | 2.0 |
| Comp. Ex. 8 | Cab-O-Sil M5 | 3.0 | 7A | 15 | 200 | 239 | 0.84 | 6.0 | 5.0 |
| Comp. Ex. 9 | IRCOGEL 905 | 3.0 | 7A | 15 | 200 | 222 | 0.90 | 4.0 | 3.0 |

An acrylic-melamine based high solids baking enamel paint described in Formulation C was used to test the rheological additives prepared in accordance with Examples 1 and 2, a Control example (Comparative Example 7) and two comparative additives (Comparative Examples 8 and 9). The additives were added to the paint using the post-addition method previously described with the exception of the additive of Comparative Example 8 which was added during the grind stage of the paint preparation. The additive loading was adjusted to obtain a 3.0 pounds per 100 gallon solids loading of the rheological additive. The paint properties Examples 153 and 154 and Comparative Examples 10–12

An alkyd-melamine based high solids baking enamel paint described in Formulation D was used to test the rheological additives prepared in accordance with Examples 1 and 2, a Control example (Comparative Example 10) and two comparative additives (Comparative Examples 11 and 12). The additives were added to the paint using the post-addition method previously described with the exception of the additive of Comparative Example 11 which was added during the grind stage of the paint preparation. The additive loading was adjusted to obtain a 8.0 pounds per 100 gallon solids loading of the rheological additive. The paint properties were tested in accordance with procedures described previously and are summarized in Table 8.

Brookfield, Stormer and Zahn Cup #4 viscosities, and sag using the procedures discussed previously.

Example 165

9.68 grams of the liquid rheological additive prepared

FORMULATION D: HIGH SOLIDS ALKYD-MELAMINE BAKING ENAMEL

| Ingredient | Generic Name | Manufacturer | Pounds[1] |
|---|---|---|---|
| AROPLAZ 6232-A4-85 | Alkyd Resin | NL Chemicals, Inc. | 168.0 |
| n-Butanol | n-Butanol | Ashland Chemical | 10.5 |
| Xylene | Xylene | Ashland Chemical | 73.3 |
| Titanox 2020 | Titanium Dioxide | NL Chemicals, Inc. | 419.0 |
| Disperse at high speed for 15 minutes. | | | |
| AROPLAZ 6232-A4-85 | Alkyd Resin | NL Chemicals, Inc. | 284.0 |
| Cymel 303 | Hexamethoxymethyl-melamine | American Cyanamid | 140.0 |
| Byk VP-451 | Catalyst | Byk-Mallinkrodt | 15.7 |
| Xylene | Xylene | Ashland Chemical | 70.0 |
| | Total (without the rheological additive) | | 1180.5 |

[1] Basic formulation; test composition may be prepared with different amounts, but proportional to those set forth.

TABLE 8

| Example Number | Additive Example Number | Loading (lbs./Hg) | FOG | Zahn Cup #4 Visc. (sec) | Brookfield Visc. (cP) 10 rpm | Brookfield Visc. (cP) 100 rpm | TI | Sag (mils) RT | Sag (mils) 350° F. |
|---|---|---|---|---|---|---|---|---|---|
| 153 | 1 | 8.0 | 7A | 34 | 772 | 612 | 1.26 | 5.0 | 5.0 |
| 154 | 2 | 8.0 | 7A | 30 | 2260 | 792 | 2.85 | 16.0 | 16.0 |
| Comp. Ex. 10 | None | 0 | 7A | 19 | 265 | 335 | 0.79 | 5.0 | 3.5 |
| Comp. Ex. 11 | Cab-O-Sil M5 | 8.0 | 7A | 33 | 600 | 525 | 1.14 | 6.0 | 5.0 |
| Comp. Ex. 12 | IRCOGEL 905 | 8.0 | 7A | 24 | 400 | 370 | 1.08 | 5.0 | 5.0 |

Examples 155-164

To illustrate that the rheological additives of the present invention can yield stable rheological properties, various additives prepared in accordance with some of the previous examples were incorporated into the polyester resin based high solids baking enamel paint of Formulation A. The paint properties were tested shortly after preparation and after four months of storage at 25° C. in accordance with the procedures described previously and are summarized in Table 9.

in accordance with Example 1 was post-added to a 1,283.7 gram portion of a high solids air-dry paint described in Formulation E. The additive loading was equivalent to 6.0 pounds per 100 gallons on a solids basis. The paint properties which were obtained are presented in Table 10.

Example 166

10.34 grams of the liquid rheological additive prepared in accordance with Example 2 was post-added to a 1,283.7 gram portion of a high solids air-dry paint

TABLE 9

| Example Number | Additive Example | Loading (Lbs/100 Gal) (Solids Basis) | Viscosity Zahn Cup #4 (Sec) | Viscosity Brookfield (cP) 10 RPM | Viscosity Brookfield (cP) 100 RPM | Thixotropic Index | Sag (mils) R.T. | Sag (mils) (350° F.) | Stability Data (4 Months) Zahn Cup #4 (Sec) | Stability Data (4 Months) Sag (mils) R.T. | Stability Data (4 Months) Sag (mils) (350° F.) |
|---|---|---|---|---|---|---|---|---|---|---|---|
| 155 | 3 | 3.0 | 24 | 760 | 494 | 1.54 | 8 | 8 | 27 | 8 | 7 |
| 156 | 1 | 3.0 | 25 | 760 | 570 | 1.33 | 9 | 9 | 31 | 7 | 7 |
| 157 | 6 | 3.0 | 27 | 1240 | 640 | 1.94 | 9 | 9 | 25 | 9 | 8 |
| 158 | 7 | 3.0 | 20 | 820 | 440 | 1.86 | 6 | 6 | 22 | 7 | 6 |
| 159 | 11 | 3.0 | 27 | 600 | 560 | 1.09 | 6 | 6 | 25 | 7 | 7 |
| 160 | 12 | 3.0 | 25 | 700 | 506 | 1.38 | 8 | 8 | 30 | 8 | 7 |
| 161 | 14 | 3.0 | 23 | 840 | 560 | 1.50 | 7 | 6 | 27 | 8 | 8 |
| 162 | 18 | 3.0 | 24 | 1480 | 610 | 2.43 | 10 | 9 | 29 | 9 | 8 |
| 163 | 19 | 3.0 | 26 | 2020 | 720 | 2.81 | 14 | 14 | 30 | 12 | 12 |
| 164 | 31 | 3.0 | 25 | 360 | 375 | 0.96 | 6 | 6 | 25 | 8 | 7 |

Evaluation of Rheological Additives in a High Solids Air-Dry Alkyd Formulation

Rheological additives of the present invention were evaluated in a high solids air-dry alkyd paint formulation described in Formulation E for fineness of grind, described in Formulation E. The additive loading was equivalent to 6.0 pounds per 100 gallons on a solids basis. The paint properties which were obtained are presented in Table 10.

Comparative Example 13

A 1,283.7 gram portion of the high solids air-dry paint described in Formulation E was prepared without any rheological additive, and tested for paint properties. The paint properties which were obtained are presented in Table 10.

Evaluation of Rheological Additives in a High Solids Air-Dry Enamel

Rheological additives of the present invention were evaluated in a high solids air-dry enamel described in Formulation F for fineness of grind, Brookfield, and Stormer viscosities and sag using the procedures discussed previously.

Example 167

10.34 grams of the liquid rheological additive prepared in accordance with Example 2 were added to a 1,062.07 gram portion of a high solids air-dry enamel described in Formulation F. The additive loading was equivalent to 6.0 pounds per 100 gallons on a solids basis. The paint properties which were obtained are presented in Table 11.

Comparative Example 14

A 1,062.07 gram portion of the high solids air dry enamel described in Formulation F was prepared without any rheological additive, and tested for paint properties. The paint properties which were obtained are presented in Table 11.

Evaluation of Rheological Additives in Alkyd-Melamine Baking Enamel

Rheological additives of the present invention were evaluated in an alkyd-melamine baking enamel described in Formulation G for fineness of grind, Brookfield and Zahn Cup #4 viscosities, and sag using the procedures discussed previously.

Example 168

10.34 grams of the liquid rheological additive prepared in accordance with Example 2 were added to a 1,091 gram portion of an alkyd-melamine baking enamel described in Formulation G during the grind stage. The additive loading was equivalent to 6.0 pounds per 100 gallons on a solids basis. The paint properties which were obtained are presented in Table 12.

Comparative Example 15

A 1,091 gram portion of the alkyd-melamine baking enamel described in Formulation G was prepared without any rheological additive, and tested for paint properties. The paint properties which were obtained are presented in Table 12.

Evaluation of Rheological Additives in Aliphatic Air-Dry Alkyd Enamel

Rheological additives of the present invention were evaluated in an aliphatic air-dry alkyd enamel described in Formulation H for fineness of grind, Brookfield and Stormer viscosities, and sag using the procedures discussed previously.

Example 169

11.43 grams of the liquid rheological additive prepared in accordance with Example 2 were added to a 1,077.1 gram portion of an aliphatic air-dry alkyd paint described in Formulation H during the grind stage. The additive loading was equivalent to 6.0 pounds per 100 gallons on a solids basis. The paint properties which were obtained are presented in Table 13.

Example 170

11.43 grams of the liquid rheological additive prepared in accordance with Example 2 was added with a Lightnin mixer at 1,200 rpm for 2 minutes to a 1,077.1 gram portion of an aliphatic air-dry alkyd paint described in Formulation H after the paint was completely made. The additive loading was equivalent to 6.0 pounds per 100 gallons on a solids basis. The paint properties which were obtained are presented in Table 13.

Comparative Example 16

A 1,077.1 gram portion of the alkyd-melamine baking enamel described in Formulation H was prepared without any rheological additive, and tested for paint properties. The paint properties which were obtained are presented in Table 13.

| FORMULATION E: HIGH SOLIDS AIR-DRY ALKYD FORMULATION | | | |
|---|---|---|---|
| Ingredient | Generic Name | Manufacturer | Pounds[1] |
| AROPLAZ 6440-A4-85 | Alkyd Resin | NL Chemicals, Inc. | 320.0 |
| Nuosperse 657 | Dispersant | Huls | 7.1 |
| Xylene | Xylene | Ashland Chemical | 74.0 |
| 4% Ca Nuxtra | Drier | Huls | 9.3 |
| Red Oxide R2899 | Red Iron Oxide | Pfizer | 150.0 |
| Nalzin 2 Pigment | Zinc Phospho Oxide | NL Chemical, Inc. | 59.3 |
| Gammasperse 80 | Calcium Carbonate | Georgia Marble | 414.0 |
| Disperse at High Speed for 15 minutes. | | | |
| Letdown: | | | |
| AROPLAZ 6440-A4-85 | Alkyd Resin | NL Chemicals, Inc. | 120.9 |
| 6% Co Nuxtra | Drier | Huls | 3.11 |
| 12% Zr Nuxtra | Drier | Huls | 3.11 |
| Exkin #2 | Anti-Skinning Agent | Huls | 0.74 |
| Xylene | Xylene | Ashland Chemical | 122.16 |
| | | Total (without Rheological Additive) | 1,283.72 |

[1] Basic Formulation; test composition may be prepared with different amounts, but proportional to those set forth.

| FORMULATION F: HIGH SOLIDS AIR-DRY ENAMEL | | | |
|---|---|---|---|
| Ingredient | Generic Name | Manufacturer | Pounds[1] |
| AROPLAZ 6420-K3-75 | Alkyd Resin | NL Chemicals, Inc. | 125.00 |
| Xylene | Xylene | Ashland Chemical | 62.50 |
| Nuosperse 700 | Dispersant | Huls | 7.45 |
| Titanox 2020 | Titanium Dioxide | NL Chemicals, Inc. | 312.00 |
| Disperse at High Speed for 15 minutes. | | | |
| Letdown: | | | |
| AROPLAZ 6420-K3-75 | Alkyd Resin | NL Chemicals, Inc. | 396.00 |
| 6% Co Nuxtra | Drier | Huls | 3.25 |
| 6% Ca Nuxtra | Drier | Huls | 6.50 |
| 12% Zr Nuxtra | Drier | Huls | 6.50 |
| Exkin #2 | Anti-Skinning Agent | Huls | 0.77 |
| Xylene | Xylene | Ashland Chemical | 142.10 |
| | | Total (without Rheological Additive) | 1,062.07 |

[1] Basic Formulation; test composition may be prepared with different amounts, but proportional to those set forth.

| FORMULATION G: ALKYD-MELAMINE BAKING ENAMEL | | | |
|---|---|---|---|
| Ingredient | Generic Name | Manufacturer | Pounds[1] |
| Duraplex 12-808 | Alkyd Resin | Reichhold Chemicals | 198.0 |
| Xylene | Xylene | Ashland Chemical | 110.0 |
| Mix 5 minutes at 3,000 rpm. Use Dispermat (high speed disperser) with 40 mm diameter blade. | | | |
| Titanox 2101 Pigment | Titanium Dioxide | NL Chemicals, Inc. | 355.0 |
| Grind 15 minutes at 5,4000 rpm. Reduce speed and add slowly: | | | |
| Duraplex 12-808 | Alkyd Resin | Reichhold Chemicals | 215.0 |
| Xylene | Xylene | Ashland Chemical | 36.0 |
| Mix 5 minutes at 2,000 rpm. Cool to below 90° F. with ice before adding: | | | |
| Uformite 27-809 | Benzoguanamine Formaldehyde | Reichhold Chemicals | 177.0 |
| Mix 5 minutes at 2,000 rpm | | | |
| | | Total (without Rheological Additive) | 1,091.0 |

[1] Basic Formulation; test composition may be prepared with different amounts, but proportional to those set forth.

| FORMULATION H: ALIPHATIC AIR-DRY ALKYD PAINT | | | |
|---|---|---|---|
| Ingredient | Generic Name | Manufacturer | Pounds[1] |
| AROPLAZ 1266 M-70 | Long Oil Alkyd Resin | NL Chemicals, Inc. | 60.0 |
| Mineral Spirits 663 | Mineral Spirits | Ashland Chemical | 60.0 |
| Mix until uniform, then add at 1,000 rpm: | | | |
| Titanox 2102 | Titanium Dioxide | NL Chemicals, Inc. | 285.0 |
| Gammasperse | Calcium Carbonate | Georgia Marble | 155.0 |
| Disperse at 5,400 rpm for 15 minutes and then reduce the speed to 1,000 rpm and add: | | | |
| Letdown: | | | |
| AROPLAZ 1266 M-70 | Long Oil Alkyd Resin | NL Chemicals, Inc. | 414.4 |
| Mineral Spirits 663 | Mineral Spirits | Ashland Chemical | 92.8 |
| 6% Cobalt Nuxtra | Drier | Huls | 2.3 |
| 6% Zirconium Nuxtra | Drier | Huls | 6.1 |
| Exkin #2 | Anti-Skinning Agent | Huls | 1.5 |
| | | Total (without Rheological Additive) | 1,077.1 |

[1] Basic Formulation; test composition may be prepared with different amounts, but proportional to those set forth.

TABLE 10

PROPERTIES OF HIGH SOLIDS AIR-DRY ALKYD FORMULATION

| Example Number | Additive Example Number | Loading (lbs./Hg) | FOG | Zahn Cup #4 Visc. (sec) | Stormer Visc. (KU) | Brookfield Visc. (cP) 10 rpm | Brookfield Visc. (cP) 100 rpm | T.I. | Sag (mils) |
|---|---|---|---|---|---|---|---|---|---|
| 165 | 1 | 6.0 | 6.5A | 62 | 92 | 1900 | 1300 | 1.46 | 6 |
| 166 | 2 | 6.0 | 6.5A | 65 | 93 | 2900 | 1320 | 2.19 | 10 |
| Comp. | — | 0.0 | 6.5A | 56 | 91 | 1100 | 1100 | 1.0 | 5 |

TABLE 10-continued

PROPERTIES OF HIGH SOLIDS AIR-DRY ALKYD FORMULATION

| Example Number | Additive Example Number | Loading (lbs./Hg) | FOG | Zahn Cup #4 Visc. (sec) | Stormer Visc. (KU) | Brookfield Visc. (cP) 10 rpm | 100 rpm | T.I. | Sag (mils) |
|---|---|---|---|---|---|---|---|---|---|
| Ex. 13 | | | | | | | | | |

TABLE 11

PROPERTIES OF HIGH SOLIDS AIR-DRY ENAMEL FORMULATION

| Example Number | Additive Example Number | Loading (lbs./Hg) | FOG | Stormer Visc. (KU) | Brookfield Visc. (cP) 10 rpm | 100 rpm | T.I. | Sag (mils) |
|---|---|---|---|---|---|---|---|---|
| 167 | 2 | 6.0 | 7A | 65 | 750 | 320 | 2.34 | 5.5 |
| Comp. Ex. 14 | — | 0.0 | 7A | 64 | 200 | 215 | 0.93 | 4.5 |

TABLE 12

PROPERTIES OF ALKYD-MELAMINE BAKING ENAMEL PAINT

| Example Number | Additive Example Number | Loading (lbs./Hg) | FOG | Zahn Cup #4 Visc. (sec) | Brookfield Visc. (cP) 10 rpm | 100 rpm | T.I. | Sag (mils) R.T. | 350° F. (15 min) |
|---|---|---|---|---|---|---|---|---|---|
| 168 | 2 | 6.0 | 6.5A | 34 | 1450 | 632 | 2.29 | 12 | 12 |
| Comp. Ex. 15 | — | 0.0 | 6.5A | 26 | 500 | 460 | 1.04 | 7 | 7 |

TABLE 13

PROPERTIES OF ALIPHATIC AIR-DRY ALKYD ENAMEL

| Example Number | Additive Example Number | Loading (lbs./Hg) | FOG | Stormer Visc. (KU) | Brookfield Visc. (cP) 10 rpm | 100 rpm | T.I. | Sag (mils) |
|---|---|---|---|---|---|---|---|---|
| 169 | 2 | 6.0 | 7A | 68 | 980 | 435 | 2.25 | 6 |
| 170 | 2 | 6.0 | 7A | 67 | 600 | 374 | 1.60 | 3.5 |
| Comp. Ex. 16 | — | 0.0 | 7A | 66 | 340 | 306 | 1.11 | 2.5 |

The invention being thus described, it will be obvious that the same may be varied in many ways. However, such variations are not to be regarded as a departure from the spirit and scope of the invention and all such modifications are intended to be included within the scope of the following claims.

We claim:

1. A non-aqueous coating composition comprising;
   (a) a non-aqueous coating material selected from the group consisting of polyester-melamine, alkyd-melamine, acrylic-melamine, polyester-urea/formaldehyde, alkyl-urea/formaldehyde, acrylic-urea/formaldehyde, alkyd, epoxy, acrylic, urethane, acrylic urethane and vinyl based oleoresinous coating materials; and
   (b) a rheological additive comprising at least one reaction product wherein the reactants comprise:
      (i) alkoxylated aliphatic nitrogen-containing compound and organic polycarboxylic anhydride or acid;
      (ii) aliphatic diamine and organic polycarboxylic anhydride or acid;
      (iii) alkoxylated aliphatic nitrogen-containing compound and alkane diol polyepoxide ether; and
      (iv) aliphatic diamine and alkane diol polyepoxide ether;
   wherein the alkoxylated aliphatic nitrogen-containing compound has the formula represented by at least one of (I) and (II)

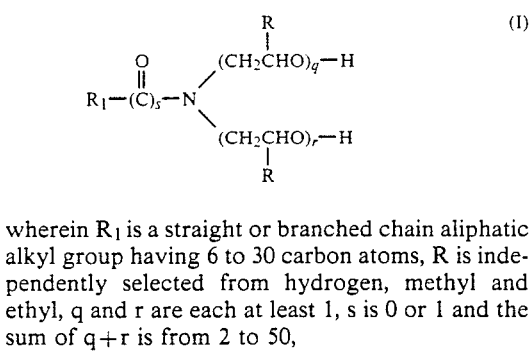

wherein $R_1$ is a straight or branched chain aliphatic alkyl group having 6 to 30 carbon atoms, R is independently selected from hydrogen, methyl and ethyl, q and r are each at least 1, s is 0 or 1 and the sum of q+r is from 2 to 50,

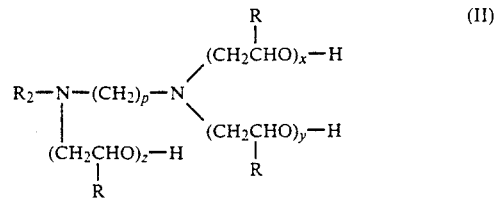

wherein $R_2$ is a straight or branched chain aliphatic alkyl group having 6 to 30 carbon atoms, p is from 1 to 20, R is independently selected from hydrogen, methyl and ethyl, x, y and z are independently selected and can be zero or an integer and the sum of x+y+z is from 1 to 50, and wherein the aliphatic diamine has the formula represented by (III)

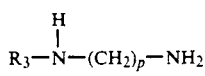
(III)

wherein $R_3$ is a straight or branched chain aliphatic alkyl group having 6 to 30 carbon atoms and p is from 1 to 20.

2. The non-aqueous coating composition of claim 1 wherein the coating composition contains an organic solvent and from about 15 to about 45 percent by weight of nonvolatile solids.

3. The non-aqueous coating composition of claim 1 wherein the coating composition contains from about 60 to about 100 percent by weight of nonvolatile solids.

4. The non-aqueous coating composition of claim 3 wherein the coating composition contains from about 65 to about 100 percent by weight of nonvolatile solids.

5. The non-aqueous coating composition of claim 4 wherein the coating composition contains from about 75 to about 100 percent by weight of nonvolatile solids.

6. The non-aqueous coating composition of claim 3 wherein the coating material is selected from polyester-melamine, polyester-urea/formaldehyde, alkyd-melamine, acrylic-melamine, acrylic-urea/formaldehyde, epoxy, and polyurethane-based baking enamels and alkyd, acrylic, epoxy, oleoresin, polyurethane, polyvinyl acetate and vinyl acrylic-based air dry paints.

* * * * *